United States Patent [19]

Poumey

[11] Patent Number: 4,833,288

[45] Date of Patent: May 23, 1989

[54] INDUCTION-HEATED ELECTRIC HOB HAVING SUPPORT WITH INDICIA

[75] Inventor: Michel Poumey, Ecully, France

[73] Assignee: Cableco, Ecully, France

[21] Appl. No.: 142,733

[22] Filed: Jan. 11, 1988

[30] Foreign Application Priority Data

Jan. 13, 1987 [FR] France ............................. 87 00420

[51] Int. Cl.$^4$ ............................................. H05B 6/12
[52] U.S. Cl. ......................... 219/10.493; 219/10.64; 219/464
[58] Field of Search ...................... 219/10.493, 10.491, 219/10.67, 10.75, 10.79, 464, 543, 506

[56] References Cited

U.S. PATENT DOCUMENTS

| | | | |
|---|---|---|---|
| 2,458,184 | 1/1949 | Marick | 219/543 |
| 3,406,279 | 10/1968 | Ziver | 219/464 |
| 3,786,222 | 1/1974 | Harnden, Jr. et al. | 219/10.493 |
| 3,843,857 | 10/1974 | Cunningham | 219/10.493 |
| 4,029,926 | 6/1977 | Austin | 219/10.493 |
| 4,453,067 | 6/1984 | Karklys et al. | 219/10.493 |

FOREIGN PATENT DOCUMENTS

| | | | |
|---|---|---|---|
| 2315819 | 1/1977 | France | |
| 2373939 | 7/1978 | France | |
| 1346574 | 2/1974 | United Kingdom | 219/464 |

Primary Examiner—Philip H. Lung
Attorney, Agent, or Firm—Wall and Roehrig

[57] ABSTRACT

Induction-heated hob or cookplate has a glass-ceramic transparent top plate, one or more inductor coils below the top plate, and a support plate that has cutout or cutouts in which the inductor coil or coils are situated. The inductor coil or coils is in the form of a spiral or flat winding or a square or rectangular flat winding. A converter receives household power (e.g. 220 v, 60 Hz) and provides an alternating current of suitable frequency (e.g. 25 KHz to 30 KHz) to the inductor coils. Between the support plate and the top plate there is an intermediate complex composed, e.g., of a mica sheet and a glass fabric sheet. Markings or decoration are disposed on the underside of the top plate or on the glass fabric sheet, where they are clearly visible through the transparent top plate, but are not subject to abrasion from cooking utensils or scrubbing. The intermediate complex serves as a cushion or shock absorber for the top plate permitting the latter to be of thinner construction than otherwise, thus reducing the spacing from the inductor coil to the cooking utensil. Also, the intermediate complex also serves as a barrier layer preventing liquids from reaching the inductor coils if the top plate should crack.

10 Claims, 4 Drawing Sheets

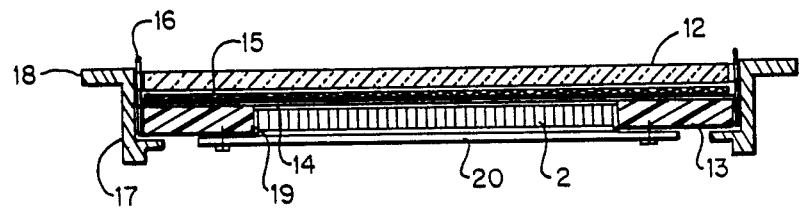
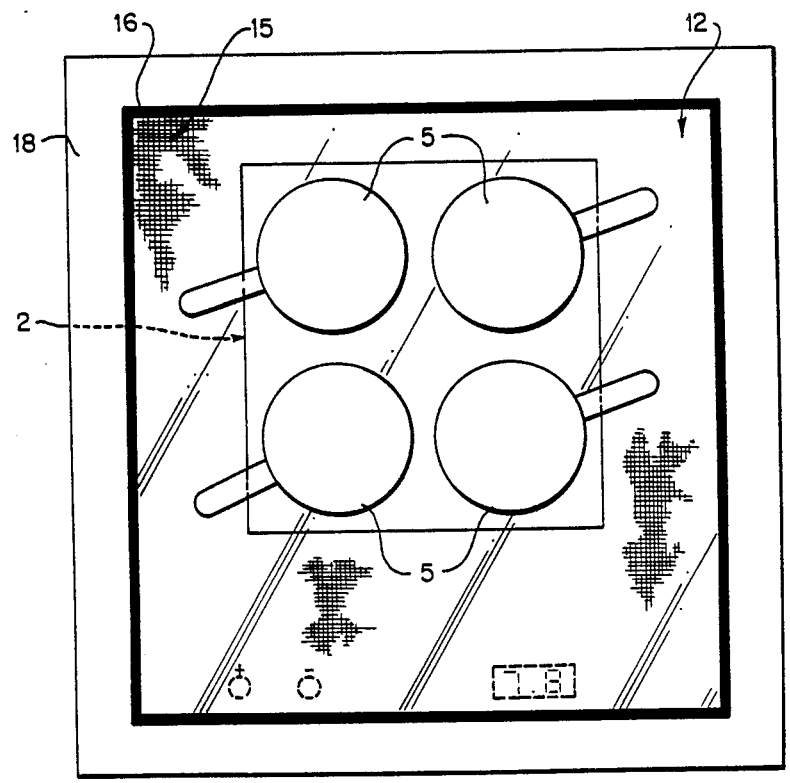

INDUCTION-HEATED ELECTRIC HOB HAVING SUPPORT WITH INDICIA

The present invention relates to an improvement in cooking units, to unit, by means of electrical induction heating.

Induction-heated cooking units have been known for a very long time and, as is evident from the attached FIG. 1, are composed of a converter (1) (or generator) supplied by the 220-volt, 50-Hz or 60-Hz mains supply and supplying a current of a frequency of 25 to 30 kHz to an induction coil (2) (or inductor). The inductor (2) generally comprises a coil in a flat spiral of a strand composed of insulated copper fibres, its terminals (3,4) being connected to the generator (1).

Such cooking units enable metal utensils (5), arranged on a plate (6) inserted between the inductor (2) and the bottom of the said utensils (5) to be heated rapidly. The electromagnetic field created by the flow of the high frequency current produced by the converter generates Foucault currents (magnetically induced eddy currents) in the metal bottom of the utensils, enabling heating. In general, when the hob i.e., range or cook-top has several cooking areas, several inductors are used, each inductor defining one burner or cooking location.

Furthermore, it has been proposed, as is evident in particular from FR-A-2,373,939 and from U.S. Pat. No. 3,843,857, that inductors be constructed in which the coil is in the form of non-contiguous spirals, in such a manner that the flat spiral obtained has a rectangular (or square) shape, the surface of which corresponds substantially to the total surface of the apparatus and thus enables the possibility of heating a plurality of utensils and the obtaining of a heating power which is greater near the center than at the edge.

In the solutions hitherto proposed for constructing the hob itself, there have been used as the support plate (6) plates of a non-metallic material, in general based on glass-ceramic. While such a material has very good properties for such an application (permeability to radiation of 25–30 kHz, resistance to abrasion, resistance to thermal shock, etc.), on the other hand such plates (6) are opaque (black or white), which makes it necessary to indicate the position of the round inductor by screen printing on the upper surface of the plate. Such marking can be defaced by abrasion when the upper surface is cleaned, or by the rubbing caused by the kitchen utensils when they are moved.

Moreover, the decoration of the upper surface of the glass-ceramic plate is very delicate and expensive to carry out, taking into account the high temperatures to which this surface is subjected, being in direct contact with the bottoms of the utensils. In general, to carry out a decoration on this upper surface, it is necessary to make use of enamels. These enamels have to be applied to the surface in the form of small points spaced from one another in order to solve the difficulties of expansion which can bring about a deterioration in the decoration (given that the thermal expansion coefficient of glass-ceramic is different from that of the enamels); use of enamels also requires additional baking during manufacture to ensure fixing of this decoration.

Furthermore, the glass-ceramic is relatively fragile where shocks are concerned, and to limit this danger, plates (6) have an increased thickness. This places the utensil further from the inductor, reducing heating efficiency.

Furthermore, from an electrical point of view, safety is not absolutely assured, considering that such plates can split, which represents a danger if liquid seeps in.

Finally, in such hobs, there is a further problems of holding and positioning the inductor with respect to the metallic support plate. One solution, as is evident from U.S. Pat. No. 3,843,857 (see FIG. 2 thereof), consists in embedding the inductor within the actual thickness of the support plate, which is complicated to carry out and also results in support plates of a very great thickness.

There has now been found, and it is this which constitutes the subject of the present invention, an improvement in such induction-heated electric hobs which enables all of these problems to be solved.

In general, the invention thus relates to an improvement in the induction-heated electric hob, ths hob being composed of a plate serving as a support for utensils, this plate being of a non-metallic material (glass-ceramic), and below which is arranged an inductor linked to a converter connected to the 220-volt, 50-Hz or 60-Hz mains supply, and which supplies a current of a frequency of 25 to 30 kHz in the said inductor (or self induction coil), this inductor comprising a coil of flat spirals in a strand composed of insulated copper fibres, the outputs of which are connected to the generator, the hob according to the invention being characterized in that:

the plate serving as support to the utensils is based on a transparent glass-ceramic mounted on an insulating support comprising a seating, inside which is arranged the inductor (or several seating, if the hob comprises several inductors);

between the support and the plate there is arranged an intermediate complex enabling the inside of the apparatus to be hidden from the view of the user, and furthermore improving the safety, in the event of any breaks in the glass-ceramic plate;

the decorative or marking elements of the hob are located below the plate and are thus protected from the abrasion which results from cleaning or rubbing caused by moving utensils against the upper surface of the glass-ceramic.

Advantageously, and in practice, in the hob according to the invention:

the intermediate complex comprises a mica sheet which is itself covered by a layer of small-mesh glass fabric, the fabric being arranged against the lower surface of the plate;

the decorative and/or marking elements defining the location of the inductor or inductors are located directly on the surface of the glass fabric and/or on the reverse surface of the plate with respect to the said glass fabric;

the glass fabric has mesh such that the light produced on the inside is visible from the outside through the transparent glass-ceramic plate, and thus permits a display showing the temperature or power consumption;

the support plate, the mica sheet, the glass fabric and the glass-ceramic plate are arranged inside a frame and are held in the latter by means of an edge joint.

Furthermore, the hob according to the invention can comprise either a single inductor of non-contiguous spirals, intheform of flat spirals whose surface corresponds substantially to the total surface of the apparatus, or a plurality of inductors each defining a cooking point, the spirals of the inductor being held in place by embedding the winding thus formed inside a polymerizable resin, in such a manner as to form plates which can be encased inside the recess of the insulating support plate (or recesses, if this support plate is intended to receive several inductors).

The invention and the advantages which it brings about will, however, be best understood with the aid of the exemplary embodiment given below by way of a non-limitative example, and which is illustrated by the attached diagrams, in which;

FIG. 2 is a cross-sectional view of a hob according to the invention which comprises a flat inductor of rectangular or square secton;

FIG. 3 is a diagrammatic plan view of the apparatus illustrated in FIG. 2;

Figure 1:
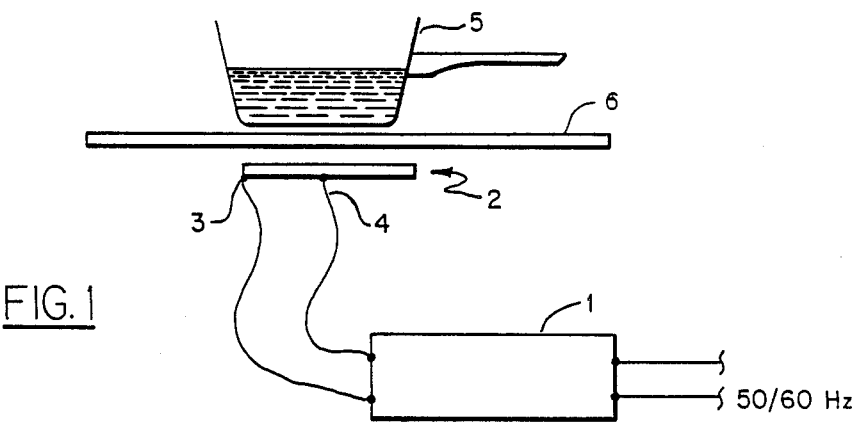
FIG. 1 shows, as was said above, in a diagrammatic manner, the structure and operation of an induction-heated electric hob.

With reference to the attached diagrams, more especially to FIGS. 2 and 3, the induction-heated electric hob according to the invention comprises a transparent glass-ceramic plate (12) having a thickness, for example, of 4 to 5 mm, and which is made flat on a support plate (13) of insulating material (plywood, asbestos cement, ceramic fibre, plastic material) having the same dimensions as the glass-ceramic plate (12). According to the invention, there is inserted between this support plate (13) and the glass-ceramic plate a sheet of micafolium (4) 0.25 to 0.5 mm thick and a layer of small-mesh glass fibre (15) 0.2 to 0.4 mm thick.

All these elements are held by a joint (16) (for example of silicone) inside a metal (or plastic) frame (17) which serves to fasten hobs of the above construction inside a casing which can contain the induction generator (not shown in FIG. 2). It is possible for the frame (17) to comprise an edging (18) which enables the hob to be mounted in a work top.

The support (13) of the glass-ceramic (12) comprises a recess (19) having dimensions which are slightly larger than those of the rectangular (or square) inductor (2), which serves as seating for the latter. The inductor (2) is held flat agaist the micafolium (14) by means of insulating bars (20) which are fixed, for example screwed, against the lower surface of the support plate (13).

From the outside (viewed from above), the user thus only sees the glass fabric (15) through the transparent glass-ceramic plate (12).

This fabric (15) can serve as a decorative element and be tinted and printed in order to appear attractive. Furthermore, the location of the inductor can be traced on the visible surface of the fabric, which, compared with current solutions in which the location of the round inductor is indicated by screen printing on the upper surface of the glass-ceramic plate, has a large number of advantages, given that the marking cannot be effaced by abration during cleaning of the upper surface of the glass-ceramic and when utensils are moved. According to another alternative, the decoration can be applied not to the surface of the fabric but rather to the reverse surface of the glass-ceramic plate (12).

Owing to this possibility of decorating the surface of the fabric and/or the reverse surface of the glass-ceramic plate, it is possible not only to obtain a variety of decorations and colours which are not altered as a result of rubbing, but such decorations are much easier to carry out than those of previous solutions and require less care, given that in the course of operation, they are subjected to lower temperatures, which attain at most approximately 250° C. on the reverse surface of the plate (and much less on the surface of the fabric), while they can attain 450° C. or more on the upper surface, which is in direct contact with the bottom of the utensils. As a result, complex decoration can be envisaged, with the possibility of having continuous surfaces, while making use of conventional printing techniques which do not require a particulr colouring or thermofixing treatment, since the problems of expansion, resistance to heat and resistance to rubbing are virtually eliminated. Moreover, the presence of the support plate (13) and the covering layers (micafolium (14) and glass fabric (15)) not only increases security in the case of possible breaks in the ceramic plate, the latter being unable to cave in, but it has also been found that the risk of breaks was limited, given that the intermediate layers perform the function of a kind of shock absorber.

Furthermore, since the glass fabric (15) has the property of allowing light to pass through, it is thus possible to incorporate a luminous numerical indicator in an appropriate cut-out in the support (13), for example to indicate either a temperatrue or a corresponding value for power consumption, etc. (see the elements shown in dotted lines in FIG. 3), these elements remaining completely invisible when the indicator is extinguished.

Finally, the fact that the glass-ceramic is transparent also enables it to preform the function of a control strip (eliminating the addition of a separate strip) in the place not occupied by the inductor. In such a case, it is advantageous to use techniques of the touch-control type, which avoids breaking through the glass-ceramic to allow a control pino pass through. In this manner, the hob remains completely clear, without any projections, and remains completely watertight, should the utensils boil over.

The construction of a rectangular or square inductor enabling a hob according to the invention to be cosntructed will be described below for a hob having a heating surface which is, for example, 30 cm×30 cm, the inductor comprising a winding of a strand of enamelled copper wire (for example 32 wires 0.56 mm in diameter) which are wound in spirals rectangular or square in shape.

Figure 4:
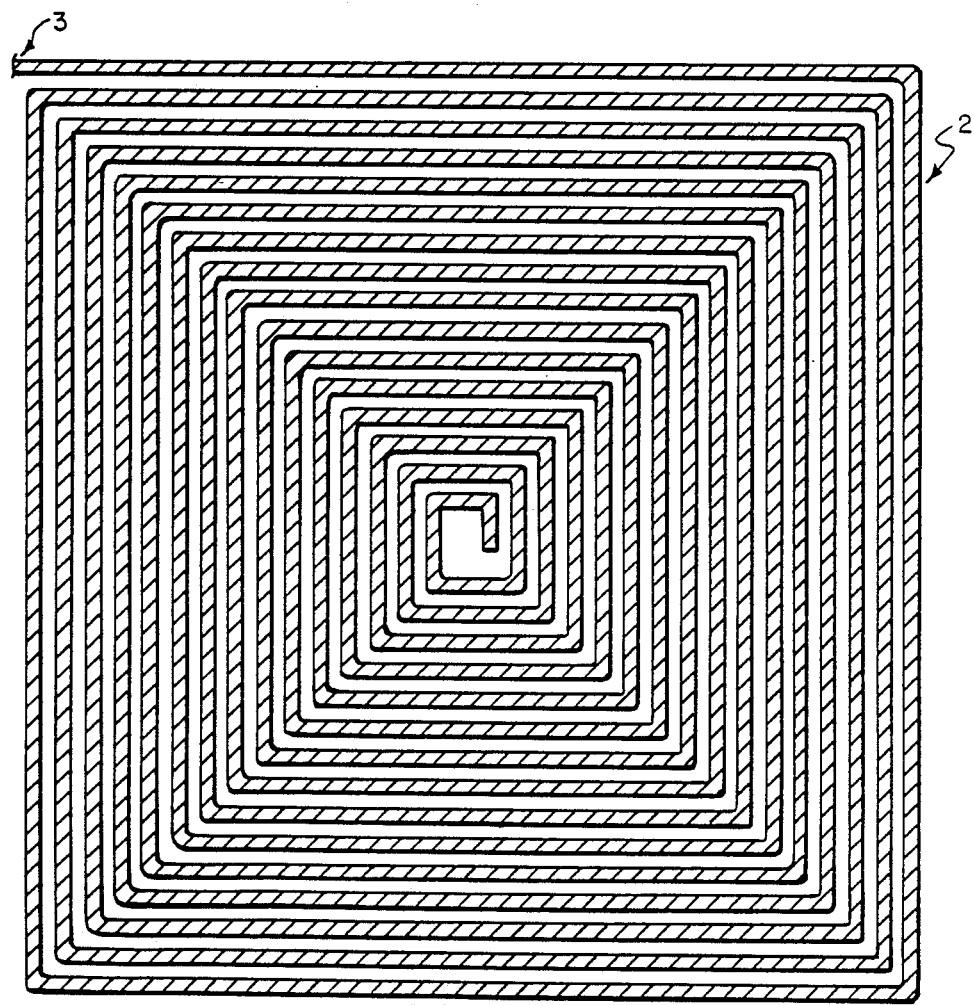
FIGS. 4 and 5 are plan views of two embodiments of a rectangular inductor which can be used for constructing a hob according to the invention.
Figure 5:
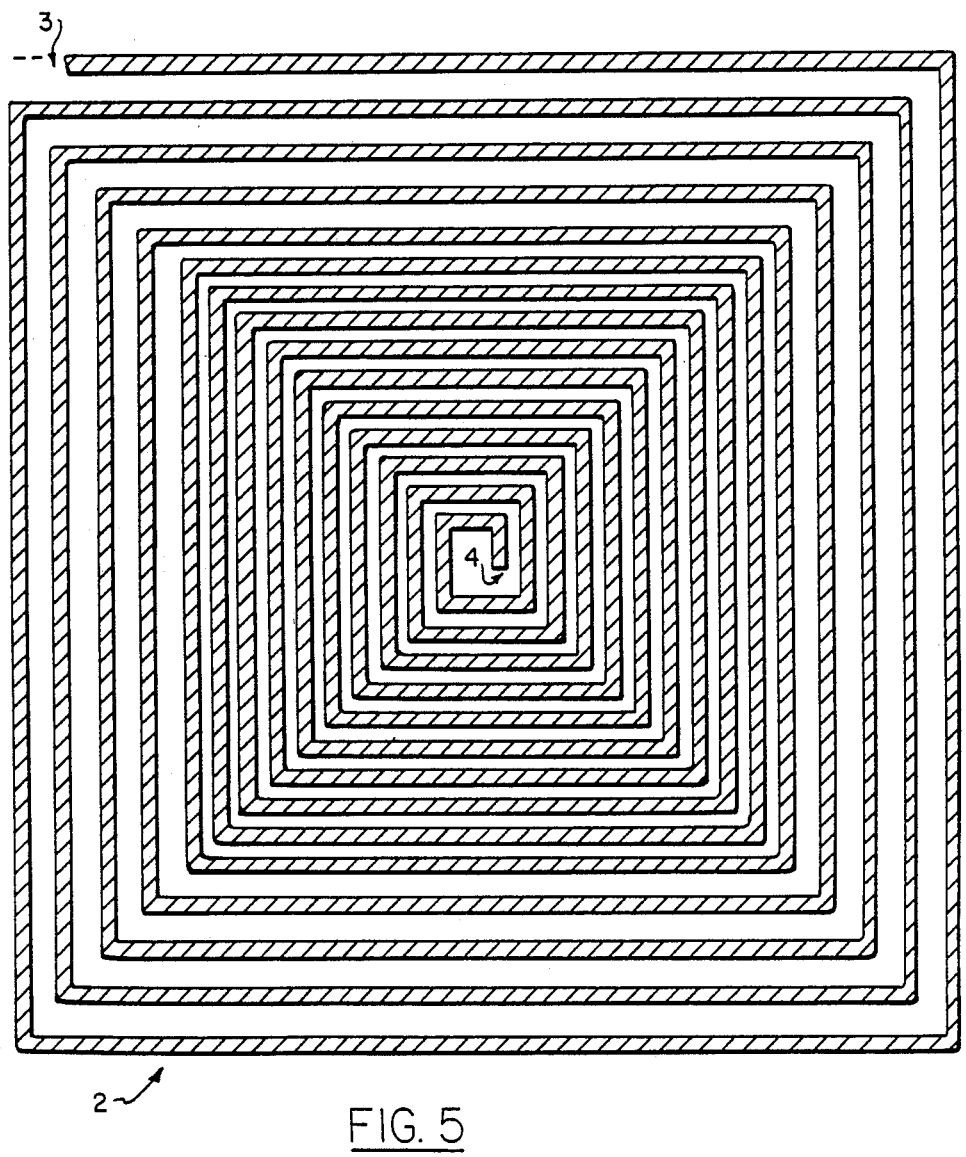

FIGS. 4 and 5 illustrate two types of inductor constructed for such a hob, according to the invention, these inductors being in the form of spirals such that the spirals are non-continguous. The mechanical maintenance of the spirals with resepct to each other is achieved, for example, by means of a polymerisable resin or a cement which is resistant to high temperature (at least 185° C.).

For an inductor having dimensions of 30 cm×30 cm, the spiral winding comprises 19 turns which are at regular intervals with respect to one another, enabling an output of 4000 watts to be obtained when it is coupled to a generator operating at approximately 30 kHz and supplied by the 220-volt mains supply at 50 to 60 Hz.

Since the spirals are non-continguous, it is thus possible to concentrate the induced power in certain areas as desired, by decreasing the separation between the spirals in particular in the area where the greatest power is required. In practice, it is advantageous to increase the power towards the center of the inductor, since the electromagnetic field is already more intense in this area. Such an increase has the advantage that a saucepan pan with a round bottom, standing alone on the hob above the central area of a rectangular or square inductor is heated more rapidly. The valuable result of this central increase in power lies in the fact that the heating power decreases progressively when the utensil is moved from the center towards the vertexes or corners of the rectangle or square. This therefore constitutes a simple means of varying the heating power, simply by moving the utensil from the center towards the vertexes, or vice versa.

FIG. 5 illustrates a variant of an inductor, enabling a greater increase in the electromagnetic field in the central area, in which the spirals are much closer to one another than the outside area.

It is thus possible when several saucepans are to be heated simultaneously to vary the heating power in each of them, by putting towards the center the one which is to be heated rapidly and putting towards the vertexes those which are to be simmered. If all the saucepans are simmering, the central area naturally remains free, by putting the said saucepans side by side, as is evident from the attached FIG. 3, where four saucepans (5) have been shown.

Figure 6:
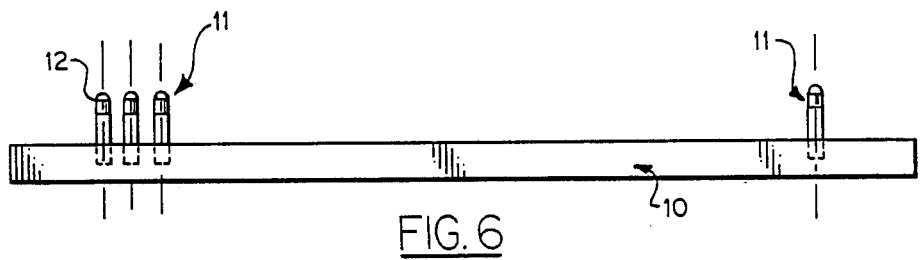
FIGS. 6 and 7 are respectively a side view and a plan view illustrating the construction of the inductor which forms part of the hob according to the invention.
Figure 7:
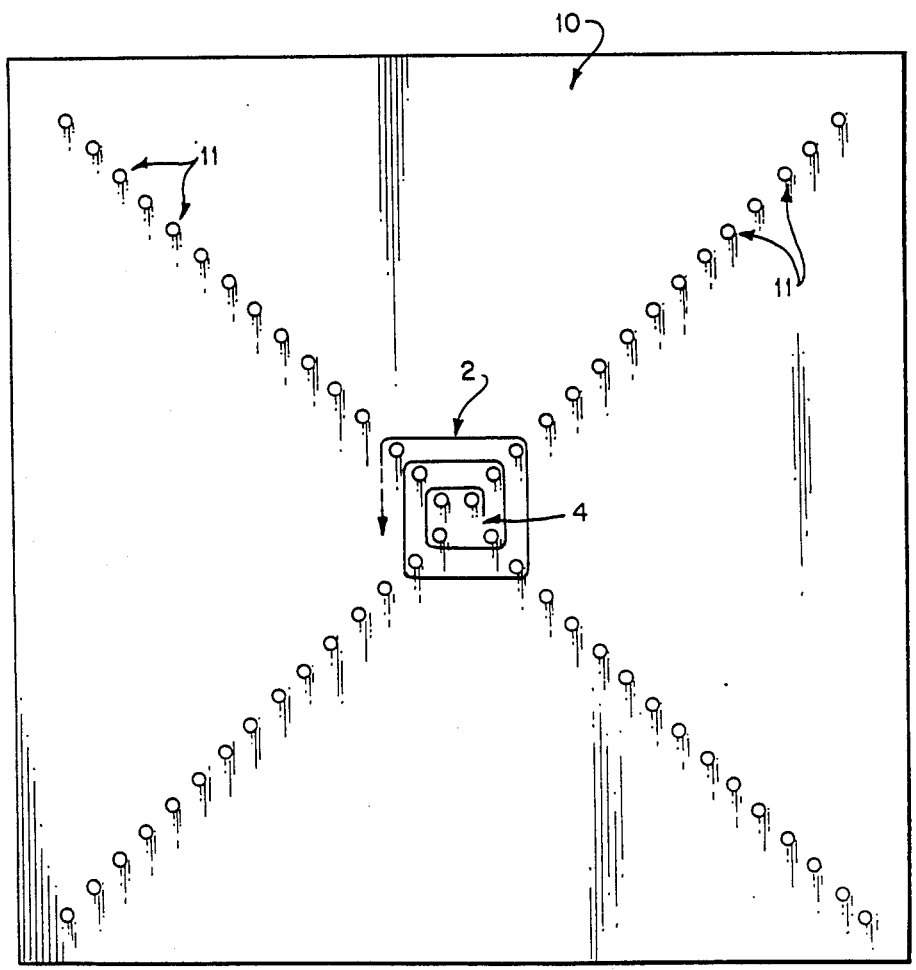

The construction of such rectangular or square inductors can be easily carried out in the following manner, by means of a simple piece of equipment such as that illustrated by FIGS. 6 and 7.

Such a piece of equipment is essentially composed of a flat plate (10) (of metal, steel or aluminum, for example), the surface of which is larger than that of the inductor to be constructed, and on which are fixed studs (11) perpendicular to th said plate and arranged at the vertex of each spiral which will constitute the inductor. The strand is arranged with a certain tension, for example from the center towards the edge, and thus is wound around each stud substantially at a right angle. when the winding is carried out, a peripheral edging is left around the plate, defining a perimeter which is slightly greter than that of the inductor, and a polymerisable resin is poured inside the mold which is thus formed. When the resin has been poured, an upper plate serving as a lid is placed and bolted on the threads (12) which are on the ends of the studs (11). This upper plate enables the coil to be kept flat and prevents any resin from flowing out during handling. The assembly is then closed, and it is next placed in an oven in order to carry out polymerisation quickly.

After polymerisation, the assembly is released from the mold, the lid having been removed, by lifting the inductor vertically from the bottom plate (10). This piece of equipment can then be reused to manufacture a new inductor.

Of course, it could be envisaged to use the equipment only once, to form an integral part of the inductor, but it is then essential to use plates based on an insulating material (asbestos cement, mica, glass-fibre reinforced resin, etc.) instead of metal plates.

The inductor constructed in this way is mounted in the manner described above inside a support plate (13) of insulating material and is held on its lower side by bars (20) which are also insulating material. Above this plate there are also arranged the layer of mica (14), the layer of fabric (15) and finally the transparent glass-ceramic 912), naturally after having applied a decorative motif, if desired, either on the surface of the fabric (15) or on the bottom of the glass-ceramic plte (12).

Of course, the invention is not limited to the exemplary embodiment described above, but it also includes all variants carried out in the same spirit, it being possible, as stated above, for the hob to have not just one inductor but a plurality of inductors arranged inside the insulator plate (13) and separated from one another in order to define distinct cooking areas.

I claim:

1. An induction-heated electric hob of the type in which an upper plate serves as a support for a metal cooking utensil, the upper plate being formed of a non-metallic material, below which is situated one or more inductor coils each being a flat coil in the form of a strand of a suitable conductive material in a plurality of flat turns, and having first and second terminals; and insulated support plate for the hob positioned between the upper plate and coextensive with it, which has one or more associated cutouts therein in which said one or more inductor coils is supported; a converter connected to a suitable supply of electrical power and providing to said inductor coil terminals an alternating current of a suitable frequency; and the improvement which comprises between said support plate and said upper plate, an intermediate complex which is sufficiently opaque to visibly conceal the inductor coil or coils therebeneath, and formed as a continuous sheet coextensive with the upper plate and the support plate suitable to cushion the upper plate from the support plate and the inductor coil or coils and also to prevent liquids from reaching the inductor coil or coils in the event of fracture of the upper plate;

said upper plate being formed of a transparent glass-ceramic material; and indicia formed beneath the transparent upper plate to indicate the positions of the one or more inductor coils, said indicia being visible through the upper plate yet protected thereby from abrasion from the utensil or from cleaning.

2. An electric hob as recited in claim 1 wherein said indicia are formed on said intermediate complex.

3. An electric hob as recited in claim 1 wherein said indicia are formed on a lower surface of said upper plate.

4. An induction-heated electric hob of the type in which an upper plate serves as a support for a metal cooking utensil, the upper plate being formed of a non-metallic material; below which is situated one or more inductor coils each being a flat coil in the form of a strand of a suitable conductive material in a plurality of flat turns, and having first and second terminals; below said upper plate, an insulated support plate for the hob substantially coextensive with the upper plate and which has one or more associated cutouts therein in which said one or more inductor coils is supported; a converter connected to a suitable supply of electrical power and providing to said inductor coil terminals an alternating current of a suitable frequency; and the improvement which comprises, in between the support plate and the upper plate, a mica sheet covering the support plate and one or more inductor coils, and a layer of small-mesh glass fabric atop said mica sheet and against a lower surface of the upper plate, wherein said upper plate is formed of a transparent ceramic-glass material; and indicia situated beneath the upper plate and visible therethrough to demark positions of the one or more inductor coils situated beneath the mica sheet.

5. An electric hob as recited in claim 4 further comprising a frame joining the support plate, the mica sheet, the glass fabric, and the glass-ceramic upper plate, including an edge joint.

6. An electric hob as recited in claim 4 wherein said indicia are located on the glass fabric layer.

7. An electric hob as recited in claim 4 wherein said glass fabric has a sufficiently open mesh that permits light beneath it to be visible through the transparent upper plate; and further comprising luminous display means below said fabric layer permitting a luminous display that indicates a cooking parameter to be viewed through the upper plate.

8. An electric hob as defied in claim 4 wherein said inductor coil or coils occupy an area corresponding to substantially the entire area of the upper plate, thus permitting even heating of utensils of non-round shape.

9. An electric hob as defined in claim 4 wherein said inductor coil is rectangular and has a central area of a smaller spacing between turns than at edges theerof, so that there is greater heating power at the central area.

10. An electric hob as defined in claim 4 wherein the strand of each inductor coil is embedded in a polymerized resin.

* * * * *